(12) United States Patent
Bae (10) Patent No.: US 9,838,452 B2
(45) Date of Patent: Dec. 5, 2017

(54) METHOD AND SYSTEM FOR GENERATING BANDWIDTH ADAPTIVE SEGMENT FILE FOR HTTP BASED MULTIMEDIA STREAMING SERVICE

(71) Applicant: Electronics and Telecommunications Research Institute, Daejeon (KR)

(72) Inventor: Seong Jun Bae, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 426 days.

(21) Appl. No.: 14/571,585

(22) Filed: Dec. 16, 2014

(65) Prior Publication Data

US 2015/0172344 A1 Jun. 18, 2015

(30) Foreign Application Priority Data

Dec. 17, 2013 (KR) .......................... 10-2013-0156936

(51) Int. Cl.
| | | |
|---|---|---|
| G06F 15/16 | (2006.01) |
| H04L 29/06 | (2006.01) |
| H04L 12/26 | (2006.01) |
| H04L 29/08 | (2006.01) |
| H04L 12/24 | (2006.01) |
| H04N 21/2343 | (2011.01) |
| H04N 21/24 | (2011.01) |

(52) U.S. Cl.
CPC ............ *H04L 65/60* (2013.01); *H04L 41/509* (2013.01); *H04L 41/5019* (2013.01); *H04L 43/0876* (2013.01); *H04L 65/4084* (2013.01); *H04L 65/602* (2013.01); *H04L 65/80* (2013.01); *H04L 67/02* (2013.01); *H04N 21/2343* (2013.01); *H04N 21/2402* (2013.01)

(58) Field of Classification Search
CPC ... H04L 65/60; H04L 41/5019; H04L 41/509; H04L 43/0876; H04L 65/4084; H04L 65/602; H04L 65/80; H04L 67/02; H04L 21/2343; H04L 21/2402
USPC .......................................................... 709/219
See application file for complete search history.

(56) References Cited

U.S. PATENT DOCUMENTS 8,843,656 B2 * 9/2014 Gahm ................. H04L 65/4092
709/234
8,874,777 B2 * 10/2014 Ma ............................... 370/486
(Continued)

FOREIGN PATENT DOCUMENTS

| KR | 10-2012-0083744 A | 7/2012 |
| KR | 10-1366437 B1 | 2/2014 |

*Primary Examiner* — Imad Hussain
(74) *Attorney, Agent, or Firm* — NSIP Law (57) ABSTRACT

Provided is a method and system for generating a network bandwidth adaptive content, the method including: measuring bandwidth information of a transmission channel formed between a content server and a reception terminal; generating a target content by converting a source content to be transmitted to the reception terminal, at a transmission bitrate that is determined based on the bandwidth information; transmitting the generated target content to the reception terminal; and storing information on the target content in a dynamic adaptive streaming over hypertext transfer protocol (HTTP) (DASH) media presentation description (MPD) file.

15 Claims, 4 Drawing Sheets

(56) References Cited

U.S. PATENT DOCUMENTS

| | | | |
|---|---|---|---|
| 8,914,835 B2* | 12/2014 | Chen | H04N 21/23439 709/231 |
| 8,959,244 B2* | 2/2015 | Lin | 709/231 |
| 2011/0255555 A1* | 10/2011 | Alexander | H04N 21/23805 370/468 |
| 2012/0004960 A1* | 1/2012 | Ma | G06Q 30/0241 705/14.4 |
| 2012/0278496 A1* | 11/2012 | Hsu | H04N 21/4381 709/231 |
| 2013/0170561 A1* | 7/2013 | Hannuksela | H04N 21/23424 375/240.25 |
| 2013/0235152 A1* | 9/2013 | Hannuksela | H04N 19/00769 348/43 |
| 2013/0254418 A1* | 9/2013 | Zhang | H04L 65/60 709/231 |
| 2013/0312046 A1* | 11/2013 | Robertson | H04N 21/00 725/93 |
| 2014/0013376 A1* | 1/2014 | Xu | H04N 21/25 725/116 |
| 2014/0019633 A1* | 1/2014 | Zhang | H04L 65/601 709/231 |
| 2014/0040498 A1* | 2/2014 | Oyman | H04W 24/04 709/231 |
| 2014/0150046 A1* | 5/2014 | Epstein | H04N 21/23439 725/126 |
| 2014/0219230 A1* | 8/2014 | Schierl | H04W 72/08 370/329 |
| 2014/0258552 A1* | 9/2014 | Oyman | H04N 19/146 709/231 |
| 2014/0317234 A1* | 10/2014 | Mueller | H04L 47/10 709/217 |
| 2014/0365677 A1* | 12/2014 | Mueller | H04L 65/80 709/231 |
| 2014/0372569 A1* | 12/2014 | Bouazizi | H04L 67/02 709/219 |
| 2015/0052236 A1* | 2/2015 | Friedrich | H04L 43/08 709/224 |
| 2016/0014184 A1* | 1/2016 | Rehan | H04L 5/0085 709/219 |
| 2016/0050241 A1* | 2/2016 | Lotfallah | H04L 67/2804 709/219 |
| 2016/0134677 A1* | 5/2016 | Mueller | H04L 65/602 709/219 |

\* cited by examiner

METHOD AND SYSTEM FOR GENERATING BANDWIDTH ADAPTIVE SEGMENT FILE FOR HTTP BASED MULTIMEDIA STREAMING SERVICE

CROSS-REFERENCE TO RELATED APPLICATION

This application claims the priority benefit of Korean Patent Application No. 10-2013-0156936, filed on Dec. 17, 2013, in the Korean Intellectual Property Office, the disclosure of which is incorporated herein by reference.

BACKGROUND

1. Field of the Invention

Embodiments of the present invention relate to a method and system for generating a network bandwidth adaptive content and transmitting the generated network bandwidth adaptive content to a reception terminal.

2. Description of the Related Art

A dynamic adaptive streaming over hypertext transfer protocol (HTTP) (DASH) technology refers to a streaming method based on an HTTP protocol and a web server that may perform adaptive streaming based on a state of a transmission channel by preparing a plurality of content file sets encoded at various bitrates with respect to the same content, and by transmitting a content file of a corresponding bitrate based on a measured network bandwidth when providing a streaming service.

In the case of applying the DASH technology, a plurality of content files having different bitrates within an appropriate bitrate range corresponding to a network bandwidth may need to be prepared with respect to content that is not prepared as a file and is generated in real time.

Also, when content files are prepared, for example, encoded at various bitrates and the range of bitrates of the content files does not match a transmission bandwidth range of an actual transmission channel, it may be difficult to perform bandwidth adaptive content transmission.

For example, it may be assumed that content file sets of five bitrates, for example, file 1: 500 kbps, file 2: 800 kbps, file 3: 1.5 Mbps, file 4: 2 Mbps, and file 5: 5 Mbps, are prepared with respect to the same content. In this instance, in the case of performing actual streaming, when a bandwidth of a transmission channel varies within the range of 100 kbps through 300 kbps as a result of measuring the bandwidth of the transmission channel, it may be difficult to perform network bandwidth adaptive content transmission. A delay may occur every time a bandwidth is insufficient to transmit a file of 500 kbps. When the bandwidth of the transmission channel varies in a band greater than 5 Mbps, it may be difficult to perform the network bandwidth adaptive content transmission due to the same reason.

Also, when the variation range of the bandwidth is narrow, it may not be possible to perform the network bandwidth adaptive content transmission. For example, when the bandwidth varies within the range of 900 kbps through 1.2 Mbps, a file encoded at 800 kbps may not be serviced using a file encoded at the above bitrate. In this case, it may also be difficult to perform the network bandwidth adaptive content transmission.

To outperform the above issues, a method of preparing content files having appropriate bitrates with respect to the entire bandwidth variation is employed. However, the method may not realistically solve the issues due to a limited capacity of a web server or a file server.

SUMMARY

An embodiment of the present invention provides a method and system that may automatically generate a content optimal for a case in which a bandwidth of a network channel used to provide a dynamic adaptive streaming over hypertext transfer protocol (HTTP) (DASH) time-varies, and may provide the content statistically optimal for a network situation.

Accordingly, a content set of a bitrate optimal for any of a real-time broadcasting content and an existing single-bitrate content may be prepared by dynamically selecting the most appropriate bitrate based on a measured network bandwidth. Through this, it is possible to adapt to a real-time variation in a network bandwidth and to perform the optimal content streaming.

According to an aspect of the present invention, there is provided a method of generating a network bandwidth adaptive content, the method including: measuring bandwidth information of a transmission channel formed between a content server and a reception terminal; generating a target content by converting a source content to be transmitted to the reception terminal, at a transmission bitrate that is determined based on the bandwidth information; transmitting the generated target content to the reception terminal; and storing information on the target content in a DASH media presentation description (MPD) file.

The method of generating the network bandwidth adaptive content may further include transmitting the DASH MPD file to at least one reception terminal that is connected to the content server.

The generating of the target content may include: determining an increment of the transmission bitrate used to generate the target content, based on the bandwidth information; and determining the number of target contents having different transmission bitrates, based on the increment.

The determining of the increment may include automatically determining the increment so that a quality difference between target contents is maintained to be consistent.

The determining of the number of target contents may include: determining the number of target contents to be greater than a predetermined reference when the increment of the transmission bitrate of the transmission channel is greater than a predefined reference; and determining the number of target contents to be less than the predetermined reference when the increment of the transmission bitrate of the transmission channel is less than the predefined reference.

The measuring of the bandwidth information may include calculating an average bandwidth of the transmission channel and a variance of the bandwidth based on a predetermined time unit.

The generating of the target content may include generating the target content that maintains the same transmission bitrate based on a constant policy region (CPR) unit having a bandwidth estimation point (BEP) to obtain information on a predetermined number of bandwidths within the transmission channel.

The generating of the target content may include: measuring real-time bandwidth information at each BEP based on a CPR that is divided into at least a predetermined number of BEPs with respect to the transmission channel; calculating a quality value of the target content that is generated within the CPR; measuring a rate-distortion based on the measured quality value of the target content when the CPR is changed; calculating an average and a variance of bandwidth information measured in the CPR; calculating a dynamic bandwidth range of the CPR based on the calculated average and variance; calculating the number of target contents to be used in the CPR and a bitrate of each target content; and performing an HTTP streaming service by encoding each target content at each corresponding bitrate.

Effect

According to embodiments of the present invention, it is possible to automatically generate a content optimal for a case in which a bandwidth of a network channel used to provide a dynamic adaptive streaming over hypertext transfer protocol (HTTP) (DASH) time-varies, and to provide, to a reception terminal, the content statistically optimal for a network situation.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a method and system for automatically generating a network bandwidth adaptive content according to an embodiment of the present invention will be described with reference to the accompanying drawings.

The present invention may adapt to a real-time variation in a network bandwidth and may perform optimal content streaming to a reception terminal by dynamically selecting the most appropriate bitrate based on a measured network bandwidth and thereby preparing a content set encoded at a bitrate optimal for any of a real-time broadcasting content and an existing single-bitrate content.

Figure 1:
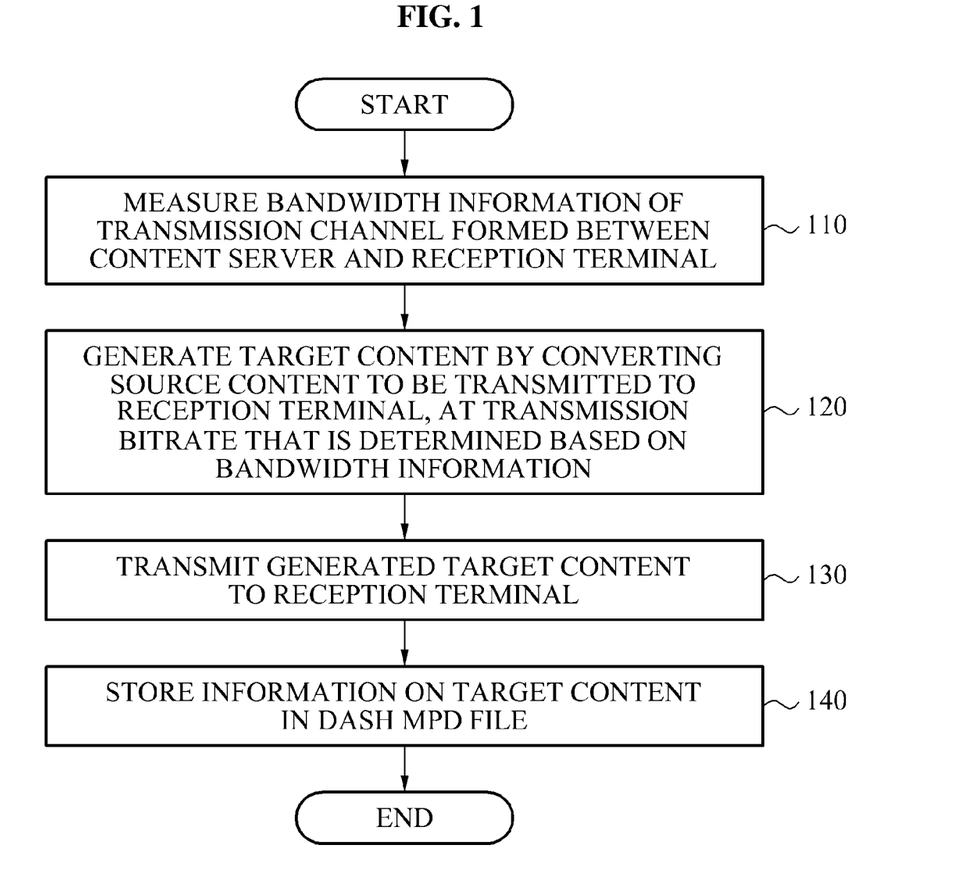
FIG. 1 is a flowchart illustrating a method of generating a network bandwidth adaptive content according to an embodiment of the present invention.

FIG. 1 is a flowchart illustrating a method of generating a network bandwidth adaptive content according to an embodiment of the present invention. The method of generating the network bandwidth adaptive content may be performed within a content server for communication between the content server and a reception terminal.

Referring to FIG. 1, in operation 110, the content server may measure bandwidth information of a transmission channel formed between the content server and the reception terminal. The bandwidth information may be used to measure a bandwidth and measure a variation characteristic of the bandwidth based on a predetermined time unit. According to an embodiment, bandwidth information may be measured based on a predetermined time unit and may be used to calculate an average bandwidth and a variance value of the transmission channel.

According to an embodiment, the bandwidth range may be defined as expressed by the following Equation 1.

$$G^{min}_j = \hat{R}_{j-1} - A\sigma_{j-1}^2$$

$$G^{max}_j = \hat{R}_{j-1} + A\sigma_{j-1}^2 \qquad \text{[Equation 1]}$$

In Equation 1, $G^{min}_j$ and $G^{max}_j$ denote a minimum frequency value and a maximum frequency value of the bandwidth with respect to a j-th CPR, respectively, $\hat{R}_{j-1}$ denotes an average bandwidth value with respect to the j-th CPR, A denotes a predetermined constant, and $\sigma_{j-1}^2$ denotes a variance of the bandwidth with respect to a (j–1)-th CPR. A section between $G^{min}_j$ and $G^{max}_j$ may be calculated as the bandwidth range. A method of calculating an average and a variance will be described below.

In operation 120, the content server may generate a target content by converting a source content to be transmitted to the reception terminal, at a transmission bitrate that is determined based on the bandwidth information.

To prepare a target content for covering the bandwidth range in real time based on a variation characteristic of bandwidth information measured for each CPR, target contents of various bitrates may be required when a variation of a bandwidth is great. A transmission bitrate of target content based on bandwidth information may be predetermined. Accordingly, a relatively large number of target contents may be required for the bandwidth range having the same average value, however, having a great variance value.

When determining an increment of the transmission bitrate used to generate the target content, based on the bandwidth information, the number of target contents having different transmission bitrates may be determined based on the increment. Here, the increment may be automatically determined so that a quality difference between target contents may be maintained to be consistent at a BEP.

In the case of determining the number of target contents, when the increment of the transmission bitrate of the transmission channel is greater than a predefined reference, the number of target contents may be determined to be greater than a predetermined reference. When the increment of the transmission bitrate of the transmission channel is less than the predefined reference, the number of target contents may be determined to be less than the predetermined reference.

Hereinafter, a method of measuring bandwidth information and generating a target content based on the measured bandwidth information according to an embodiment will be described.

As described above, real-time bandwidth information may be measured at each BEP based on a CPR that is divided into at least a predetermined number of BEPs with respect to the transmission channel. Here, a calculation method may be used.

A quality value of the target content that is generated within the CPR may be calculated. Although a transmission bitrate of the target content varies, the quality value of the target content may need to be maintained to be consistent. In this case, the target content may be viewed at the reception terminal without causing awareness of difference. The quality value of the target content may be calculated with respect to PSNR (Peak Signal To Noise Ratio): $D_j(k)$.

Every time the CPR is changed, it is possible to repeatedly perform measuring real-time bandwidth information at each BEP and calculating the quality value of the generated target content.

According to an embodiment, when a CPR is changed, a rate-distortion may be measured based on a quality value of a target content measured in a previous CPR. A rate-distortion of an image of the target content may be measured according to the following Equation 2.

$$R(D) = \alpha D + \beta \qquad \text{[Equation 2]}$$

In Equation 2, D denotes the quality value of the target content, R(D) denotes a bandwidth corresponding to the quality value D, and $\alpha$ and $\beta$ are estimated. The rate-distortion may be measured using a one-dimensional graph estimation.

An average and a variance of bandwidth information measured in a previous CPR of a corresponding CPR may be calculated according to the following Equation 3.

$$\hat{R}_j = \frac{1}{m} \sum_{n=1}^{m} R_j(n) \qquad \text{[Equation 3]}$$

$$\sigma_j^2 = \frac{1}{m} \sum_{n=1}^{m} \left( R_j(n) - \hat{R}_j \right)^2$$

In Equation 3, $\hat{R}_j$ and $\sigma_j^2$ denote an average a variance of a j-th CPR, m denotes the number of the entire BEPs within the j-th CPR, and $R_j(n)$ denotes a bandwidth of the transmission channel n-th measured in the j-th CPR.

The dynamic bandwidth range of the CPR may be calculated based on the calculated average and variance. Here, Equation 1 may be used. According to an embodiment, the dynamic bandwidth range relates to a section between $G^{min}_j$ and $G^{max}_j$, and may be determined by constant A as a predetermined range of a variance value of the bandwidth corresponding to up and down based on the average bandwidth value.

When the bandwidth range is determined, the number of target contents to be used for the CPR and to be transmitted to the reception terminal, and a bitrate of each target content may be calculated according to the following Equation 4.

$$a_j = \text{ceil}\left( \frac{G^{max}_j - \hat{R}_{j-1}}{\alpha D^{intv}} \right) + 1 \qquad \text{[Equation 4]}$$

$$G_j(p) = \hat{R}_{j-1} - G^{min}_j + (p-1)\alpha D^{intv},$$

where $p = \{1, 2, 3, \ldots, a_j\}$

In Equation 4, $D^{intv}$ denotes a predetermined distortion range between target contents, $G^{min}_j$ and $G^{max}_j$ denote a minimum frequency value and a maximum frequency value of the bandwidth with respect to the j-th CPR, respectively, $\hat{R}_{j-1}$ denotes an average of a (j-1)-th CPR, and $\alpha$ denotes a constant value obtained through the measuring of the rate-distortion.

The number of target contents $a_j$ and a bitrate $G_j(p)$ of a p-th target content may be calculated according to Equation 4.

Referring again to FIG. 1, the target content generated through operations 110 and 120 may be transmitted from the content server to the reception terminal in operation 130. According to an embodiment, it is possible to provide an adaptive HTTP streaming service within a CPR based on the number of target contents and a bitrate of each target content. Here, the HTTP streaming service may be provided by encoding each target content at a corresponding bitrate.

In operation 140, the content server may store information on the generated target content in a DASH MPD file. Information on the target content generated by measuring, by the content server, bandwidth information of the transmission channel formed between the content server and the reception terminal and by converting a source content at a transmission bitrate that is determined based on the bandwidth information may be stored in the DASH MPD file.

The DASH MPD file and content files encoded at various bitrates may be stored in the content server. The reception terminal may perform bandwidth adaptive content streaming by receiving the DASH MPD file, by autonomously measuring a bandwidth of the transmission channel, and then by downloading a target content most suitable for the bandwidth of the transmission channel among various types of candidate target contents included in the DASH MPD file.

Figure 2:
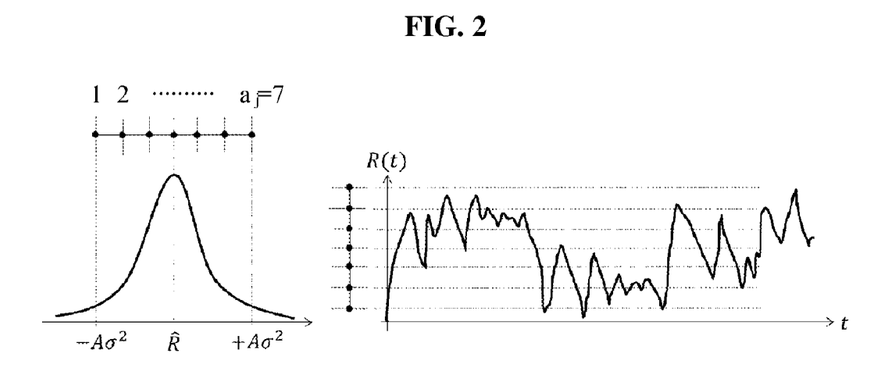
FIGS. 2 and 3 illustrate examples of a network bandwidth having a different variation characteristic according to an embodiment of the present invention.
Figure 3:
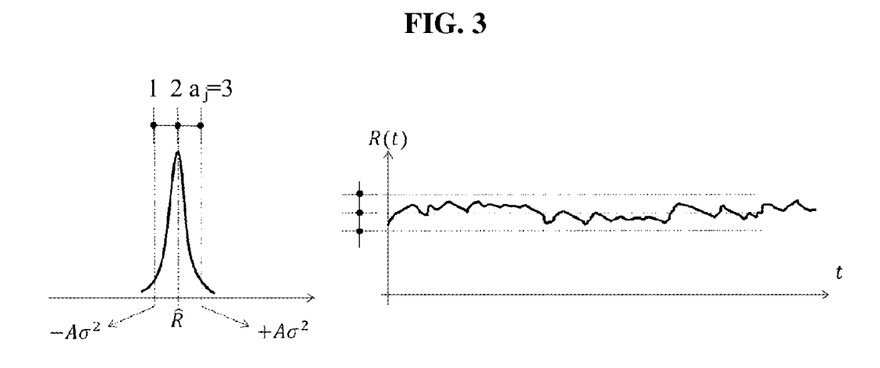

FIGS. 2 and 3 illustrate examples of a network bandwidth having a different variation characteristic according to an embodiment of the present invention.

Referring to FIGS. 2 and 3, it can be known that the average bandwidth is the same for both examples, however, a variation of the bandwidth over time is different for each example. Accordingly, a target content capable of covering the bandwidth range by A of a variance based on the average bandwidth is required.

When generating the target content capable of covering the bandwidth range with a relatively great variance, a relatively large number of target contents encoded at various bitrates may need to be prepared for a case in which the bandwidth is relatively great as illustrated in the example of FIG. 2, compared to the example of FIG. 3.

FIG. 2 illustrates an example in which seven target contents are present within a CPR and FIG. 3 illustrates an example in which three target contents are present within a CPR. Accordingly, a more number of target contents need to be prepared in the example of FIG. 2 than in the example of FIG. 3. Although the bandwidth varies within a further wide range, it is possible to provide a streaming service using a target content optimal for a real-time bandwidth.

Figure 4:
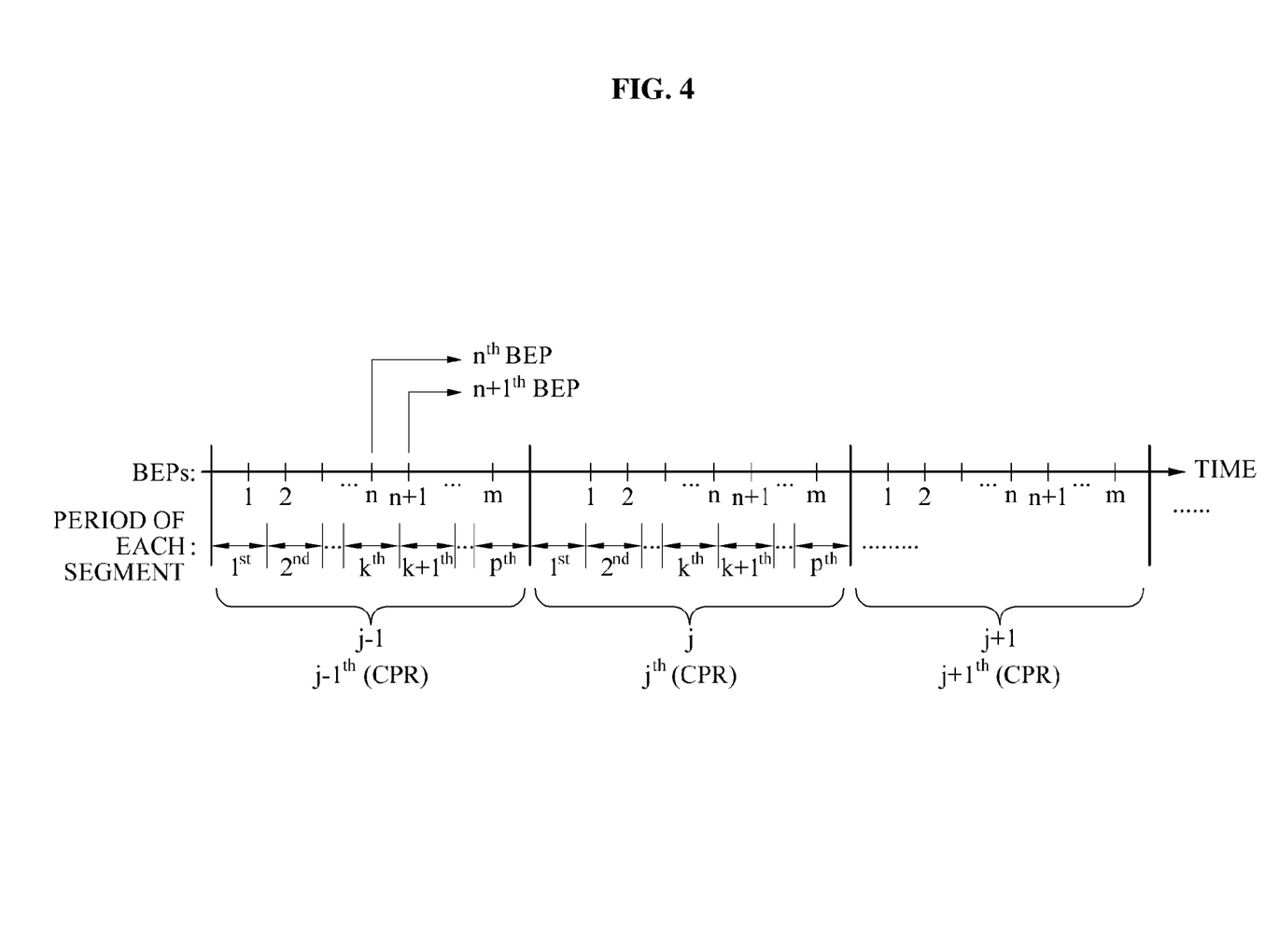
FIG. 4 illustrates an example of applying a bandwidth information measurement method in actual streaming according to an embodiment of the present invention.

FIG. 4 illustrates an example of applying a bandwidth information measurement method in actual streaming according to an embodiment of the present invention. FIG. 4 illustrates an example of a progress based on a time unit for applying a method of generating a network bandwidth adaptive content according to an embodiment of the present invention.

Referring to FIG. 4, a streaming time section may be divided into CPRs corresponding to the largest unit. A CPR refers to a section in which the same service policy, for example, a set of the same target contents, is maintained. An algorithm proposed by the present invention may calculate and generate a new target content set based on a CPR unit, and may perform DASH streaming adaptive to a real-time varying bandwidth using the target content set, at a point at which the CPR starts.

A CPR may be divided into BEPs. A CPR refers to a relatively long time section in which a variation of a bandwidth is capable of being converged to an average value. A BEP refers to a unit point at which a bandwidth is capable of actually significantly varying and a time point at which a bandwidth is measured within a CPR.

A target content that is a unit of each DASH moving picture file is present within a CPR. According to a standard, a length of the target content may be readily configured. However, unless there is a particular reason, the target content may be configured using the same length for use convenience of the content server.

Figure 5:
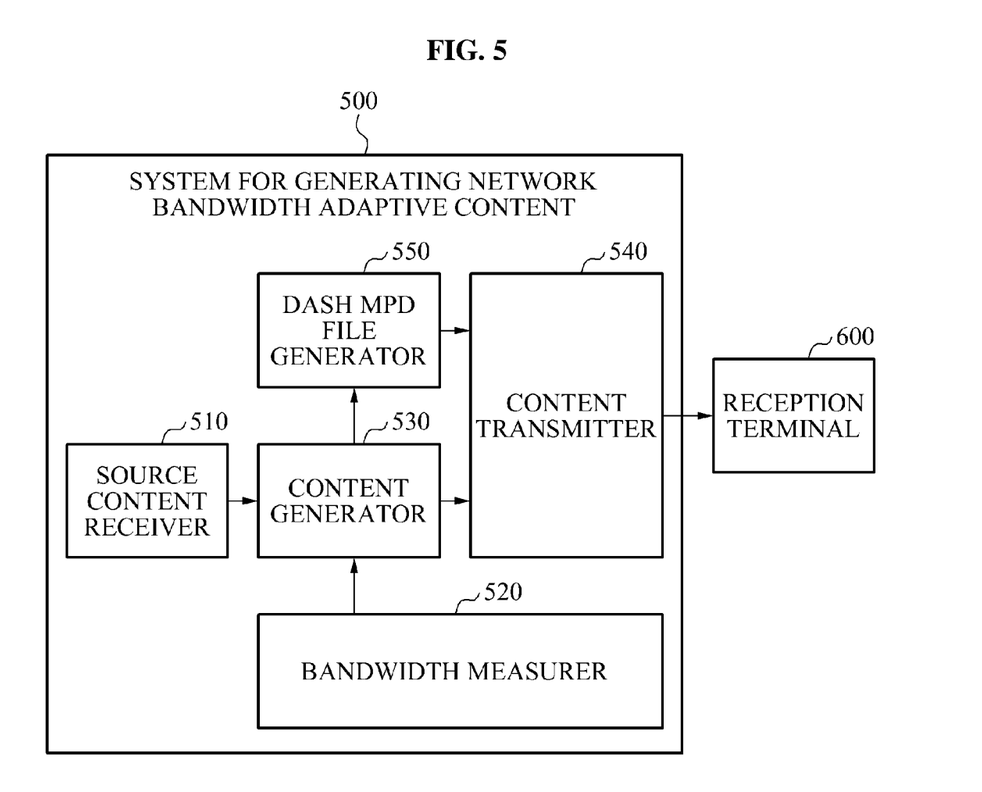
FIG. 5 is a block diagram illustrating a configuration of a system for generating a network bandwidth adaptive content according to an embodiment of the present invention.

FIG. 5 is a block diagram illustrating a configuration of a system 500 for generating a network bandwidth adaptive content according to an embodiment of the present invention. FIG. 5 illustrates a portion of a DASH based streaming system in which the present invention is applied.

A source content receiver 510 may receive a source content. A target content may be generated based on the source content.

A bandwidth measurer 520 may measure bandwidth information of a transmission channel formed between a content server and a reception terminal 600. The bandwidth measurer 520 may measure statistical bandwidth information with respect to terminals being currently serviced on an existing DASH server.

Using Equation 4 and Equation 4, an average and a variance of a measured bandwidth may be calculated with respect to each CPR and the dynamic bandwidth range may be obtained using the average and the variance.

A content generator 530 may generate a target content to be transmitted to the reception terminal 600, using the measured bandwidth information and the source content. The content generator 530 may dynamically generate a content file having various bitrates in real time, based on statistical bandwidth information measured by the bandwidth measurer 520.

To this end, the content generator 530 may generate a target content that maintains the same transmission bitrate based on a CPR unit having a BEP to obtain information on at least a predetermined number of bandwidths within the transmission channel.

In the case of dynamically generating a target content and in this instance, generating a set of target contents having different bitrates, an increment of a bitrate between two files may be automatically determined so that a quality difference between target contents generated by increasing each bitrate may be maintained to be consistent. Here, the number of target contents having different bitrates to be generated may be determined based on the measured bandwidth variation, and the number of target contents may vary for each CPR.

Also, the DASH MPD file generator 550 may newly update a DASH MPD file in which corresponding content is applied every time a target content set having a new bitrate is generated, and thereby enables the reception terminal 600 to autonomously perform a network bandwidth adaptive content streaming while maintaining an existing protocol method using the corresponding information.

The generated DASH MPD file and target contents of various bitrates may be transferred to the reception terminal 600. The reception terminal 600 may also perform an adaptive streaming method of autonomously measuring a bandwidth of a transmission channel and then requesting a content file most suitable for a bandwidth of the transmission channel among various types of target contents included in the DASH MPD file and receiving the requested content file from the content server.

A content transmitter 540 may transmit, to the reception terminal 600, the target content that is generated by the content generator 530 based on the real-time bandwidth information, and may also transmit the DASH MPD file to the reception terminal 600 so that the reception terminal 600 may refer to the DASH MPD file.

According to embodiments of the present invention, a content set of a bitrate optimal for any of a real-time broadcasting content and an existing single-bitrate content may be prepared by dynamically selecting the most appropriate bitrate based on a measured network bandwidth. Through this, it is possible to adapt to a real-time variation in a network bandwidth and to perform the optimal content streaming.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of generating a network bandwidth adaptive content using dynamic adaptive streaming over hypertext transfer protocol (HTTP) (DASH), the method comprising:
    measuring bandwidth information of a transmission channel formed between a content server and a reception terminal;
    generating a target content by converting a source content to be transmitted to the reception terminal, at a transmission bitrate that is determined based on the bandwidth information;
    transmitting the generated target content to the reception terminal; and
    storing information on the target content in a DASH media presentation description (MPD) file,
    wherein the generating of the target content comprises
        determining an increment of the transmission bitrate, which is used to generate the target content, based on the bandwidth information, and
        determining a number of target contents having different transmission bitrates, based on the increment.

2. The method of claim 1, further comprising transmitting the DASH MPD file to at least one reception terminal that is connected to the content server.

3. The method of claim 1, wherein the determining of the increment comprises automatically determining the increment so that a quality difference between target contents is maintained to be consistent.

4. The method of claim 1, wherein the determining of the number of target contents comprises determining the number of target contents to be greater than a reference number, in response to the increment of the transmission bitrate being greater than a reference increment, and determining the number of target contents to be less than the reference number, in response to the increment of the transmission bitrate being less than the reference increment.

5. The method of claim 1, wherein the measuring of the bandwidth information comprises calculating an average bandwidth of the transmission channel and a variance of bandwidth based on a time unit.

6. The method of claim 1, wherein the generating of the target content comprises maintaining the same transmission bitrate based on a constant policy region (CPR) unit comprising a bandwidth estimation point (BEP) to obtain information on a number of bandwidths within the transmission channel.

7. The method of claim 6, wherein the measuring of the bandwidth information comprises measuring a bandwidth range based on the following equation:

$$G^{min}_j = \hat{R}_{j-1} - A\sigma_{j-1}^2$$

$$G^{max}_j = \hat{R}_{j-1} + A\sigma_{j-1}^2,$$

where $G^{min}_j$ is a minimum frequency value of the bandwidth with respect to a j-th CPR, $G^{max}_j$ is a maximum frequency value of the bandwidth with respect to the j-th CPR, $\hat{R}_{j-1}$ is an average bandwidth value with respect to the j-th CPR, A is a constant, and $\sigma_{j-1}^2$ is a variance of the bandwidth with respect to a (j-1)-th CPR.

8. The method of claim 1, wherein the generating of the target content comprises measuring real-time bandwidth information at bandwidth estimation points (BEPs) based on a constant policy region (CPR) that is divided into at least a number of the BEPs with respect to the transmission channel, calculating a quality value of the target content, which is generated within the CPR, measuring a rate-distortion based on the measured quality value of the target content when the CPR is changed, calculating an average and a variance of bandwidth information measured in the CPR, calculating a dynamic bandwidth range of the CPR based on the calculated average and variance, calculating the number of target contents, which are to be used in the CPR, and a bitrate of the target content, and performing an HTTP streaming service by encoding the target content at each corresponding bitrate.

9. The method of claim 8, further comprising repeatedly performing, with respect to a point at which the CPR is changed, measuring real-time bandwidth information at each of the BEPs based on the CPR that is divided into the at least the number of BEPs with respect to the transmission channel, and calculating a quality value of the target content, which is generated within the CPR.

10. The method of claim 8, wherein the measuring of the rate-distortion comprises measuring the rate-distortion using a one-dimensional graph estimation method as expressed by the following equation:

$$R(D) = \alpha D + \beta,$$

where D is the quality value of the target content, R(D) is a bandwidth corresponding to the quality value D, and $\alpha$ is a first estimated value, and $\beta$ is a second estimated value.

11. The method of claim 8, wherein the calculating of the average and the variance comprises calculating the average and the variance according to the following equation:

$$\hat{R}_j = \frac{1}{m}\sum_{n=1}^{m} R_j(n)$$

$$\sigma_j^2 = \frac{1}{m}\sum_{n=1}^{m} (R_j(n) - \hat{R}_j)^2,$$

where $\hat{R}_j$ is an average of a j-th CPR, $\sigma_j^2$ is a variance of a j-th CPR, m is the number of an entire bandwidth information measurement points within the j-th CPR, and $R_j(n)$ is a bandwidth of the transmission channel n-th measured in the j-th CPR.

12. The method of claim 8, wherein the calculating of the number of target contents and the bitrate of the target content comprises calculating the number of target contents and the bitrate of the target content according to the following equation:

$$a_j = \text{ceil}\left(\frac{G^{max}_j - \hat{R}_{j-1}}{\alpha D^{intv}}\right) + 1$$

$$G_j(p) = \hat{R}_{j-1} - G^{min}_j + (p-1)\alpha D^{intv},$$

where $p = \{1, 2, 3, \ldots, a_j\}$, where $D^{intv}$ is a distortion range between target contents, $G^{min}_j$ is a minimum frequency value of the bandwidth with respect to a j-th CPR, $G^{max}_j$ is a maximum frequency value of the bandwidth with respect to the j-th CPR, $\hat{R}_{j-1}$ is an average of a (j-1)-th CPR, and $\alpha$ is a constant value obtained through the measuring of the rate-distortion.

13. An apparatus to generate a network bandwidth adaptive content using dynamic adaptive streaming over hypertext transfer protocol (HTTP)(DASH), the apparatus comprising:

a bandwidth measurer configured to measure bandwidth information of a transmission channel formed between a content server and a reception terminal;

a content generator configured to generate a target content by converting a source content to be transmitted to the reception terminal, at a transmission bitrate that is determined based on the bandwidth information;

a content transmitter configured to transmit the generated target content to the reception terminal; and a DASH media presentation description (MPD) file generator configured to store information on the target content in a DASH MPD file, wherein the content generator is further configured to determine an increment of the transmission bitrate used to generate the target content, based on the bandwidth information, so that a quality difference between target contents is maintained to be consistent, and to determine a number of target contents having different transmission bitrates, based on the increment.

14. The apparatus of claim 13, wherein the content generator is further configured to generate the target content to maintain the same transmission bitrate based on a constant policy region (CPR) unit having a bandwidth estimation point (BEP) to obtain information on a number of bandwidths within the transmission channel.

15. A method of receiving a network bandwidth adaptive content using dynamic adaptive streaming over hypertext transfer protocol (HTTP)(DASH), the method comprising:
- receiving a DASH media presentation description (MPD) file from a content server;
- requesting the content server for a target content corresponding to bandwidth information of a transmission channel by which the target content is transmitted from the content server, based on the DASH MPD file, and
- receiving the target content from the content server,
- wherein the DASH MPD file is generated by measuring, by the content server, bandwidth information of a transmission channel formed between the content server and a terminal, by generating the target content by converting a source content at a transmission bitrate that is determined based on the bandwidth information, and by storing information on the target content in the DASH MPD file, and
- wherein the generating of the target content comprises
  - determining, by the content server, an increment of the transmission bitrate, which is used to generate the target content, based on the bandwidth information, and
  - determining, by the content server, a number of target contents having different transmission bitrates, based on the increment.

* * * * *